United States Patent [19]

Zimmerman et al.

[11] Patent Number: 5,218,005
[45] Date of Patent: Jun. 8, 1993

[54] POLYUREA ELASTOMERS MADE USING POLYAMINE/CARBONYL ADDUCTS AS CHAIN EXTENDERS

[75] Inventors: Robert L. Zimmerman, Austin; Dudley J. Primeaux, Elgin, both of Tex.

[73] Assignee: Texaco Chemical Company, White Plains, N.Y.

[21] Appl. No.: 777,847

[22] Filed: Oct. 16, 1991

[51] Int. Cl.$^5$ ................................................. C08J 9/22
[52] U.S. Cl. ......................................... 521/58; 521/159; 521/163; 521/167; 128/60; 128/68
[58] Field of Search .................. 528/60, 68; 521/159, 521/163, 164, 58

[56] References Cited

U.S. PATENT DOCUMENTS 4,705,814 11/1987 Grigsby, Jr. et al. ............... 521/159
4,732,919 3/1988 Grigsby et al. ..................... 521/159

FOREIGN PATENT DOCUMENTS 0441488 8/1992 European Pat. Off. .

OTHER PUBLICATIONS

"Spray Polyurea, Versatile High Performance Elastomer for the Polyurethane Industry", Proceedings of the SPI 32nd Annual Technical/Marketing Conference pp. 126–130, Oct. 1989, D. J. Primeaux, II.

"Sprayed Polyurea Elastomers Offer Superior Performance", Utech '90, pp. 189–194, Apr. 1990, D. J. Primeaux, II.

"Technical Bulletin, Polyurea, Spray Formulations Based On Aliphatic Isocyanates and Chain Extenders", Texaco Chemical Company, 1990.

U.S. patent application Ser. No. 07/402,296 filed Sep. 5, 1989.

U.S. patent applicatin Ser. No. 07/479,015 filed Feb. 9, 1990.

Primary Examiner—John Kight, III
Assistant Examiner—Duc Truong
Attorney, Agent, or Firm—James J. O'Loughlin; Henry H. Gibson

[57] ABSTRACT

Low molecular weight, polyoxyalkylene polyamine reacts with carbonyl compound making polyamine adduct used as chain extender in preparing tack-free, smooth polyurea elastomers, useful in solventless spray coatings.

16 Claims, No Drawings

POLYUREA ELASTOMERS MADE USING POLYAMINE/CARBONYL ADDUCTS AS CHAIN EXTENDERS

BACKGROUND OF THE INVENTION

1. Field of the Invention

This invention concerns polyurea elastomers, useful in solventless spray coatings, and more particularly to polyurea elastomers made using polyamine/carbonyl adducts as chain extenders.

2. Description of Related Information

Polyurea elastomers have found widespread utility, including as coatings such as for spray applications. These materials have a desirable balance of properties including: light stability; fast cure; relative water insensitivity; solventless systems; excellent physical properties, including tensile strength, elongation and abrasion resistance; pigmentation capability; ease of application, such as using commercially available spray application equipment; and, since no catalyst is needed, consistent reactivity and long term storage stability. These and other well known properties are discussed in the literature, such as by D.J. Primeaux II, in "Spray Polyurea, Versatile High Performance Elastomer for the Polyurethane Industry", *Proceedings of the SPI 32nd Annual Technical/Marketing Conference*, pages 126-130, Oct. 1989; and by D.J. Primeaux II, in "Sprayed Polyurea Elastomers Offer Superior Performance", *UTECH'90*. pages 189-194, Apr. 1990.

Polyureas can be made by reacting amines with isocyanates. For example, U.S. Pat. No. 4,732,919 (Grigsby, Jr. et al.) discloses polyurea elastomer made from high molecular weight polyol or polyoxyalkylene polyamine, chain extender and quasi-prepolymer of polyoxyalkylene polyamine and aromatic isocyanate. Polyurea spray formulations based on aliphatic isocyanates and chain extenders are disclosed in U.S. patent application Ser. No. 07/402,296 filed Sep. 5, 1989 and in a publication by Texaco Chemical Company entitled "Technical Bulletin, Polyurea Spray Formulations Based on Aliphatic Isocyanates and Chain Extenders", 1990. Aliphatic polyurea elastomer, useful in instrument panels, made from aliphatic isocyanate, amine-terminated polyoxyalkylene polyol and amine-terminated aliphatic chain extender is disclosed in U.S. patent application Ser. No. 07/479,015 filed Feb. 9, 1990.

Some polyurea elastomers, however, can have undesirable curing properties, such as residual tackiness, limiting their utility. There is therefore a need for polyurea elastomers which have improved cure properties.

SUMMARY OF THE INVENTION

This invention concerns polyurea elastomer which is the product of polyisocyanate reacted with polyoxyalkylene polyamine and polyamine adduct made from low molecular weight polyoxyalkylene polyamine reacted with carbonyl compound. There is also a process for making polyurea elastomer comprising reacting carbonyl compound with low molecular weight, polyoxyalkylene polyamine to make polyamine adduct; and reacting the polyamine adduct and polyoxyalkylene polyamine with polyisocyanate to make the polyurea elastomers.

DETAILED DESCRIPTION OF THE INVENTION

It is been discovered that polyurea elastomer can be made from polyamine/carbonyl adducts as chain extenders, possessing improved cure and other properties.

The polyisocyanate starting material may by any, including known, compound, or mixtures thereof, having two or more isocyanate groups bonded to an organic radical. The polyisocyanate may be a monomeric polyisocyanate or, preferably, the reaction product of a monomeric polyisocyanate with polyoxyalkylene polyamine, such as a polyurea polyisocyanate quasi-prepolymer. The term "quasi-prepolymer" describes a mixture of monomers and oligomers, essentially dimers, made using a stoichiometric excess of one type of monomer, in this case polyisocyanate, as compared with the other monomer, i.e. polyamine. Polyisocyanates include compounds shown by Formula 1.

$$R(-NCO)_z \qquad (1)$$

Polyisocyanate

In Formula 1, R is an organic radical having a valence z and can be: straight or branch chain; acyclic, cyclic, or heterocyclic; saturated, unsaturated, or include aromatic; unsubstituted or halo-substituted; hydrocarbylene having at least preferably from about 6 to about 25, and most preferably from about 6 to about 12 carbon atoms. The number of isocyanate groups, defined by z, is at least 2, preferably from 2 to about 4, and most preferably 2. Typical polyisocyanates include, among others, one or more of the following: alkylene polyisocyanates with 4 to 12 carbon atoms in the alkylene radical, such as 1,12 dodecane diisocyanate, 1,4-tetramethylene diisocyanate and 1,6-hexamethylene diisocyanate; cycloaliphatic diisocyanates such as 1,3- and 1,4-tetramethylene diisocyanate, 1-isocyanato-3,3,5-trimethyl-5-isocyanatomethylcyclohexane (isophorone diisocyanate), 4,4'-, 2,2'- and 2,4'-dicyclohexylmethane diisocyanate; aromatic polyisocyanates, such as p-phenylene diisocyanate, polymethylene polyphenyl isocyanate, 2,4-/2,6-toluene diisocyanate (TDI) dianisidine diisocyanate, bitolylene diisocyanate, naphthalene-1,4-diisocyanate, bis(4-isocyanatophenyl)methane, bis(3-methyl-3-isocyanatophenyl)methane, bis(3-methyl-4-isocyanatophenyl)methane, 4,4'-diphenylpropane diisocyanate, and methylene-bridged polyphenyl polyisocyanate mixtures, such as those containing methylene diphenyldiisocyanate isomers like methylene bis(4-phenylisocyanate) (MDI); alkaryl and aralkyl diisocyanates, such as tetraalkylxylene diisocyanates like tetramethylxylene diisocyanate; trimerized or biuretic polyisocyanates, and other isocyanates, such as described in U.S. Pat. No. 2,683,730 (Fauser et al.), U.S. Pat. No. 2,950,263 (Abbostson et al.), U.S. Pat. No. 3,012,008 (Lister), U.S. Pat. No. 3,344,162 (Rowton), U.S. Pat. No. 3,362,979 (Bentley) and U.S. Pat. No. 3,394,164 (Kolakowski et al.). Preferred polyisocyanates include tetramethylxylene diisocyanate, isophorone diisocyanate, hexamethylene diisocyanate, and cyclohexane diisocyanate.

The polyoxyalkylene polyamine, such as used to make either polyisocyanate quasi-prepolymer or as component (B) which reacts with polyisocyanate, may be any, including known, polyoxyalkylene polyamine, including mixtures thereof. The polyoxyalkylene polyamine can be a primary and/or secondary amine-terminated polyether polyol typically having: a weight average molecular weight of more than about 100 and preferably from about 200 to about 5,000; a functionality of from 2 to 6, and preferably from 2 to 3; and an amine equivalent weight of from about 750 to about 4,000. Polyoxyalkylene polyamines include compounds shown in Formula 2.

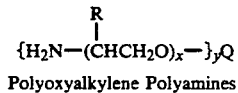

$$\{H_2N-(CHCH_2O)_x-\}_yQ \quad (2)$$
$$\overset{|}{R}$$

Polyoxyalkylene Polyamines

The variables in Formula 2 having the following meanings. Q is the polyvalent residue of an active hydrogen-containing compound used as an initiator. The valence of Q is given by y, where y is at least 2, preferably from 2 to 8, and most preferably 2 to 3. Each R is independently hydrogen or lower alkyl, such as methyl or ethyl. The R groups are preferably hydrogen and/or methyl, including mixtures. The average number of oxyalkylene repeating units per amine group, given by x, is at least 1, preferably from about 1 to about 100, and most preferably from about 1.5 to about 7.

Typical initiators include, among others, one or more of the following: polyhydroxy compounds, including diols like ethylene glycol, propylene glycol, 1,2- or 1,4-butanediols, and triols like trimethylolpropane and glycerine. Preferred initiators include ethylene glycol, propylene glycol, trimethylolpropane, and glycerine. Typical oxyalkylene repeating units include oxyethylene, oxypropylene, oxybutylene, and so on, including mixtures thereof. When two or more oxyalkylenes are used, they may be present in any form such as randomly or in blocks. Preferred polyoxyalkylene polyamines include JEFFAMINE® polyaoxyalkylene amines from Texaco Chemical Co. Inc., such as diamines D-230, D-400, D-2000 and D-4000, and triamines T-403, T-3000 and T-5000.

The relative amount of monomeric polyisocyanate to polyoxyalkylene polyamine mixture is at least a stoichiometric excess of monomeric polyisocyanate to polyoxyalkylene polyamine. Generally more than 1, preferably from about 1.5 to about 25, and most preferably from about 10 to about 25, equivalent moles of isocyanate are used per mole of amine.

Although no additional ingredients, such as solvent or catalyst, are needed or preferred to conduct the reaction, any other suitable materials may be present, if desired.

The reaction between the monomeric polyisocyanate and the polyoxyalkylene polyamine may be conducted under any suitable, including known, conditions for effecting reactions between isocyanates and amines. Typically, reactions are conducted under ambient temperature and pressure. Since the reaction precedes rapidly, the ingredients are preferably thoroughly mixed, such as using a high speed mixer.

The low molecular weight, polyoxyalkylene polyamine used to make polyamine adduct includes compounds having a structure as shown in Formula 2 and with the same meanings for variables Q, R, x and y, provided that x is less than about 10, and preferably less than about 7.

The carbonyl compound may be any suitable, including known, carbonyl compound, including mixtures thereof. The carbonyl compound includes compounds shown in Formula 3.

$$R_1\overset{\overset{O}{\|}}{C}R_2 \quad (3)$$

wherein $R_1$ and $R_2$ are independently hydrocarbyl, including linked together as cyclohydrocarbyl, or, preferably, hydrogen. Typical hydrocarbyl groups include, among others: alkyl such as methyl, ethyl, propyl, and so on, and when $R_1$ and $R_2$ are linked to form cycloalkyl such as cyclopentyl, cyclohexyl, and so on. Preferred carbonyl compounds include formaldehyde.

The relative amount of low molecular weight polyoxyalkylene polyamine to carbonyl compound is any amount sufficient to make polyamine adduct. Typically, the molar ratio of amine to carbonyl compound is from about 0.4:1 to about 3:1, preferably from about 0.5:1 to about 3:1, and most preferably from about 1:1 to about 2:1.

Although no additional ingredients, such as solvent or catalyst, are needed or preferred to conduct the adduct reaction, any other suitable materials may be present, if desired.

The reaction between the low molecular weight, polyoxyalkylene polyamine and carbonyl compound may be conducted under any suitable, including known, conditions for effecting reactions between amines and carbonyl compounds. Typically, reactions are conducted under ambient temperature and pressure, and preferably under nitrogen atmosphere. Typically, the temperature during the reaction may range from about 0° to about 200°, preferably from about 40° to about 150°, and most preferably from about 60° to about 90°, centigrade. The components are typically combined under a pressure of from about 0.01 to about 10, preferably from about 0.01 to about 4, and most preferably from 0.01 to about 1, atmospheres.

In a typical embodiment, a reaction vessel equipped with a mechanical stirrer, thermometer, addition funnel and under nitrogen atmosphere is charged with the low molecular weight, polyoxyalkylene polyamine. Then with stirring, a charge of the carbonyl compound is added and the reaction heated, typically to about 70° C., and maintained for about one-half hour before placing under vacuum, typically of about 1 mm Hg, and then heating further, typically to about 105° C., for a time sufficient to complete the reaction, typically about an hour.

The polyamine and carbonyl compound undergo a condensation reaction in which the carbonyl compound acts as a coupling agent to form a polyamine chain with at least 2, preferably from 2 to about 3, and most preferably an average of about 2, polyamine monomeric units. The reaction produces secondary amine linkages coupled by unsubstituted or hydrocarbyl-substituted methylene, such that the polyamine adduct contains both secondary amine and primary amine, the latter being the unreacted, terminal groups.

The polyamine adduct acts as a chain extender for the reaction between the polyisocyanate and the polyoxyalkylene polyamine. The chain extender reacts with the polyisocyanate providing hard-segment segregation resulting in increased polymer modulus and glass transition temperature as well as thermal stability.

The relative amount of polyisocyanate to polyoxyalkylene polyamine and polyamine adduct is any amount sufficient to make polyurea elastomer product. Typically from about 0.75 to about 1.5, preferably from about 0.85 to about 1.25, and most preferably from about 0.9 to about 1.1, moles of amine are provided per mole of isocyanate. The relative proportion of polyoxyalkylene polyamine to polyamine adduct is not critical so long as an effective amount, i.e. an amount sufficient to make polyurea elastomer having improved cure properties, of polyamine adduct is provided. Typically, from about 0.5 to about 60, preferably from about 0.5 to about 45, and most preferably from about 15 to about 40, weight percent polyamine adduct is provided based on the total amount of amine.

Other materials may be added, if desired, to the reaction. These optional ingredients include, among others, one or more of the following: other chain extenders, such as aromatic diamine or low molecular weight polyoxyalkylene polyamines; foam stabilizers, such as silicone oil or emulsifier, organic silane or siloxane; pigments or coloring agents, such as titanium dioxide; reinforcing materials, such as chopped or milled glass fibers, carbon fibers and/or other mineral fibers; blowing agents; catalysts, such as tertiary amines or organic tin compounds; fillers; surfactants; and any other suitable materials.

The polyisocyanate, polyoxyalkylene polyamine and polyamine adduct, along with any other optional ingredients, are reacted under any suitable, including known, conditions for reacting polyamines with polyisocyanate. Typically, the temperature during the reaction may range from about 0° to about 80°, preferably from about 15° to about 80°, and most preferably from about 25° to about 75°, centigrade. The components can be combined under ambient or higher pressures of up to 250, preferably from about 30 to about 200, and most preferably from about 60 to about 140, atmospheres.

When used in spray applications, the components can be impingement mixed directly using high pressure spray equipment, such as a GUSMER ® VR-H-2000 proportioner fitted with a GX-7 spray gun. The components are typically applied at a rate of at least 0.5, and preferably from about 1 to about 30, and most preferably at about 20 pounds per minute.

It has been discovered that polyurea elastomer made using polyamine adduct has not residual surface tackiness and possesses an extremely smooth surface. In addition to improved appearance and handling capabilities, the superior surface properties enhance subsequent surface treatment performance.

The following examples present illustrative embodiments of this invention without intention to limit its scope. All percentages given in the disclosure and claims are in weight percent, unless otherwise stated.

EXAMPLE

Terms used in the examples have the following meanings:

| Term | Description |
| --- | --- |
| D-230 | Polyoxypropylene diamine having a weight average molecular weight of about 230, called JEFFAMINE ® D-230 from Texaco Chemical Co. Inc. |
| D-2000 | Polyoxypropylene diamine having a weight average molecular weight of about 2,000, called JEFFAMINE ® D-2000 from Texaco Chemical Co. Inc. |
| m-TMXDI | m-α,α,α',α'-tetramethyl-α,α'-diisocyanatoxylene |

-continued

| Term | Description |
| --- | --- |
| | i.e. 1,3-bis(1-isocyanato-1-methylethyl)benzene, called m-TMXDI ® from American Cyanamid Co. Inc. |
| T-403 | Polyoxypropylene triamine, made with trimethylol propane initiator, having a weight average molecular weight of about 440, called JEFFAMINE ® T-403 from Texaco Chemical Co. Inc. |
| T-5000 | Polyoxypropylene triamine, made with glycerine initiator, having a weight average molecular weight of about 5,000, called JEFFAMINE ® T-5000 from Texaco Chemical Co. Inc. |

Unless otherwise indicated, test results given in the examples use the following procedures:

Elongation: determined by standard ASTM D-638 procedure, given in percent.

Modulus: determined by standard ASTM D-638 and D-790 procedure for 100% and 300% tests, given in psi.

Shore Hardness: determined by standard ASTM D-2240 procedure, given at initial measurement (0 seconds), and after 10 seconds (for D Hardness).

Tear Strength: determined by standard ASTM D-624 procedure, given in pounds per linear inch (pli).

Tensile Strength: determined by standard ASTM D-638 procedure including, given in psi.

EXAMPLES 1-2

Polyamine Adduct Preparation

These examples show how to make polyamine adduct. A 5 liter, 3-necked flask equipped with a mechanical stirrer, thermometer, addition funnel, and nitrogen atmosphere is charged with 3,000 grams of D-230. With stirring, 457.4 grams of a 55% solution of formaldehyde in methanol is added. The reaction is heated to 70° C. and maintained at that temperature for one-half hour. The reaction is then placed under a vacuum of 1 mm Hg, heated to 105° C. and maintained at that temperature for 1 hour. The reaction produces 3,080 grams of polyamine adduct.

In Example 2, the same procedure in followed as in Example 1 except the D-230 is replaced with T-403 and 242.6 grams of 55% methanol solution of formaldehyde are used, producing 3,049 grams of polyamine adduct.

EXAMPLES 3-7C

Polyurea Elastomers Preparation and Analysis

Examples 3, 5 and 6 show how to make polyurea elastomers using polyamine adduct made in Examples 1 and 2. Examples 4C and 7C are similar to Examples 3 and 5, respectively, except that polyamine adduct is replaced with the corresponding polyoxyalkylene polyamine precursor, for comparison.

Polyisocyanate quasi-prepolymer is prepared by mixing equal weight parts of m-TMXDI and D-2000 with vigorously agitation under ambient conditions. The reaction takes approximately 15 minutes to complete. The components listed in Table I, i.e. polyisocyanate quasi-prepolymer and a blend of polyoxyalkylene polyamines, with or without polyamine adduct, are spray mixed onto mold released, steel panel at an isocyanate to amine volume ratio of 1.00, using a plural component, GUSMER ® VR-H-2000 proportioner fitted with a GX-7 spray gun, at block and hose temperatures of about 65° C. and at a rate of 20 pounds per minute total mixture. Each component is fed at a line pressure of between 60 to 140 atmospheres. The resulting film cures in a few seconds and is tested using the previously described procedures, with the results shown in Table I.

TABLE I
POLYUREA ELASTOMER PREPARATION AND ANALYSIS

| Example No. | 3 | 4C | 5 | 6 | 7C |
|---|---|---|---|---|---|
| Component (A) | Polyisocyanate Quasi-Prepolymer | | | | |
| Component (B): | | | | | |
| T-5000 | 32.2 | 32.0 | 32.2 | 30.6 | 32.0 |
| D-2000 | 21.5 | 21.3 | 21.5 | 20.4 | 21.3 |
| T-403 | 26.9 | 26.7 | — | — | 26.7 |
| D-230 | — | 20.0 | 19.5 | 10.8 | 20.0 |
| Polyamine Adduct | 19.5$^a$ | — | 26.8$^b$ | 38.2$^b$ | — |
| Processing: Index | 1.00 | 1.05 | 1.00 | 1.00 | 1.05 |
| A/B Vol. Ratio | 1.00 | 1.00 | 1.00 | 1.00 | 1.00 |
| A/B Wt. Ratio | 1.07 | 1.08 | 1.07 | 1.06 | 1.08 |
| "Gel" time (sec) | 3.0 | 2.0 | 2.0 | 2.0 | 2.0 |
| Tack Free (sec) | 20 | <10 | 15 | 15 | <10 |
| Elastomer Properties: | | | | | |
| Tensile Strength (psi) | 916 | 951 | 873 | 927 | 951 |
| Elongation (%) | 447 | 391 | 375 | 299 | 391 |
| Tear Strength (pli) | 189 | 234 | 156 | 182 | 234 |
| Shore D Hardness: | | | | | |
| 0 sec | 34 | 40 | 34 | 37 | 40 |
| 10 sec | 18 | 27 | 21 | 26 | 27 |
| Shore A Hardness (0 sec) | 78 | 79 | 72 | 73 | 79 |
| 100% Modulus (psi) | 353 | 420 | 312 | 420 | 420 |
| 300% Modulus (psi) | 640 | 713 | 638 | 857 | 713 |

$^a$from Example 1, using D-230
$^b$from Example 2, using T-403

Polyurea elastomer made in Examples 3, 5 and 6 using polyamine adduct produces films having very smooth surfaces and no residual tackiness. In contrast, polyurea elastomers in Examples 4C and 7C have rougher surfaces and residual tackiness.

We claim:

1. Polyurea elastomer which is the product of:
   (A) polyisocyanate reacted with;
   (B) polyoxyalkylene polyamine and polyamine adduct made from low molecular weight, polyoxyalkylene polyamine reacted with carbonyl compound.

2. The polyurea of claim 1 wherein the carbonyl compound has a structure:

wherein $R_1$ and $R_2$ are independently hydrogen or hydrocarbyl.

3. The polyurea of claim 1 wherein $R_1$ and $R_2$ are hydrogen.

4. The polyurea of claim 1 wherein the polyisocyanate is a quasi-prepolymer made by reacting a stoichiometric excess of monomeric polyisocyanate with polyoxyalkylene polyamine.

5. The polyurea of claim 4 wherein the monomeric polyisocyanate is hydrocarbyl diisocyanate and the polyoxyalkylene polyamine in (A) has a structure:

wherein:
   Q is the polyvalent residue of an active hydrogen-containing compound;
   each R is independently hydrogen or lower alkyl;
   x is at least 1; and
   y is at least 2.

6. The polyurea of claim 5 wherein the hydrocarbyl diisocyanate is 1,3-bis(1-isocyanato-1-methylethyl)benzene, and the polyoxyalkylene polyamine in (A) comprises: (1) polyoxypropylene diamine having an average molecular weight of from about 200 to about 5,000; and (2) polyoxypropylene triamine having an average molecular weight of from about 400 to about 5,000.

7. The polyurea of claim 1 wherein the polyoxyalkylene polyamines have a structure:

wherein:
   Q is the polyvalent residue of an active hydrogen-containing compound;
   each R is independently hydrogen or lower alkyl;
   x is at least 1; and
   y is at least 2;
   provided that the average value for x is less than about 10 for the low molecular weight, polyoxyalkylene polyamine.

8. The polyurea of claim 7 wherein the hydrocarbyl diisocyanate is 1,3-bis(1-isocyanato-1-methylethyl)benzene, and the polyoxyalkylene polyamine in (A) comprises: (1) polyoxypropylene diamine having an average molecular weight of from about 200 to about 5,000; and (2) polyoxypropylene triamines having an average molecular weight of from about 400 to about 5,000.

9. A process for making polyurea elastomer comprising:
   (1) reacting carbonyl compound with low molecular weight, polyoxyalkylene polyamine to make polyamine adduct; and
   (2) reacting the polyamine adduct and polyoxyalkylene polyamine With polyisocyanate to make the polyurea elastomer.

10. The process of claim 9 wherein the carbonyl compound has a structure:

wherein $R_1$ and $R_2$ are independently hydrogen or hydrocarbyl.

11. The process of claim 10 wherein $R_1$ and $R_2$ are hydrogen.

12. The process of claim 9 wherein the polyisocyanate is a quasi-prepolymer made by reacting a stoichiometric excess of monomeric polyisocyanate with polyoxyalkylene polyamine.

13. The process of claim 12 wherein the monomeric polyisocyanate is hydrocarbyl diisocyanate and the polyoxyalkylene polyamine in (A) has a structure:

wherein:
   Q is the polyvalent residue of an active hydrogen-containing compound;
   each R is independently hydrogen or lower alkyl;

x is at least 1; and y is at least 2.

14. The process of claim 13 wherein the hydrocarbyl diisocyanate is 1,3-bis(1-isocyanato-1-methylethyl)benzene, and the polyoxyalkylene polyamine in (A) comprise: (1) polyoxypropylene diamine having an average molecular weight of from about 200 to about 5,000; and (2) polyoxypropylene triamine having an average molecular weight of from about 400 to about 5,000.

15. The process of claim 9 wherein the polyoxyalkylene polyamines have a structure:

wherein:

Q is the polyvalent residue of an active hydrogen-containing compound;

each R is independently hydrogen or lower alkyl;

x is at least 1; and y is at least 2;

provided that the average value for x is less than about 10 for the low molecular weight, polyoxyalkylene polyamine.

16. The process of claim 15 wherein the hydrocarbyl diisocyanate is 1,3-bis(1-isocyanato-1-methylethyl)benzene, and the polyoxyalkylene polyamine in (A) comprises: (1) polyoxypropylene diamine having an average molecular weight of from about 200 to about 5,000; and (2) polyoxypropylene triamines having an average molecular weight of from about 400 to about 5,000.

* * * * *